United States Patent [19]
Dieterich

[11] Patent Number: 6,100,940
[45] Date of Patent: Aug. 8, 2000

[54] APPARATUS AND METHOD FOR USING SIDE INFORMATION TO IMPROVE A CODING SYSTEM

[75] Inventor: Charles Benjamin Dieterich, Kingston, N.J.

[73] Assignee: Sarnoff Corporation, Princeton, N.J.

[21] Appl. No.: 09/123,238

[22] Filed: Jul. 28, 1998

Related U.S. Application Data

[60] Provisional application No. 60/072,080, Jan. 21, 1998.

[51] Int. Cl.$^7$ ...................................................... H04N 7/32
[52] U.S. Cl. ...................... 348/700; 348/701; 348/845.2; 386/112
[58] Field of Search ...................................... 348/409, 407, 348/405, 416, 420, 422, 699, 700, 701, 845.2; 386/111, 112

[56] References Cited

U.S. PATENT DOCUMENTS

| | | | |
|---|---|---|---|
| 5,504,585 | 4/1996 | fujinami et al. | 358/335 |
| 5,512,942 | 4/1996 | otsuki | 348/143 |
| 5,530,483 | 6/1996 | cooper et al. | 348/422 |
| 5,532,833 | 7/1996 | hong et al. | 358/335 |
| 5,724,100 | 3/1998 | kuchibhotla | 348/420 |
| 5,751,364 | 5/1998 | yasuda et al. | 348/416 |
| 5,796,436 | 8/1998 | shioi et al. | 348/409 |
| 5,835,163 | 11/1998 | liou et al. | 348/700 |

*Primary Examiner*—Howard Britton
*Attorney, Agent, or Firm*—William J. Burke

[57] ABSTRACT

A method and apparatus for pre-processing an image sequence to extract side information concerning the image sequence. In one embodiment, the side information is inserted into the image sequence, such that upon being encoded at a later time, the encoder can utilize the side information to best select one or more coding parameters. Alternatively, the side information can be stored on a storage device and is then made available to an encoder that is tasked with encoding the image sequence.

30 Claims, 7 Drawing Sheets

APPARATUS AND METHOD FOR USING SIDE INFORMATION TO IMPROVE A CODING SYSTEM

This application claims the benefit of U.S. Provisional Application No. 60/072,080 filed Jan. 21, 1998, which is herein incorporated by reference.

The present invention relates to an apparatus and concomitant method for optimizing video encoding. More particularly, this invention relates to a method and apparatus that performs pre-processing on an incoming or pre-recorded image sequence to extract "side information" that is then used to improve the subsequent coding of the incoming or pre-recorded image sequence.

BACKGROUND OF THE INVENTION

The increasing demand for digital video/audio information presents an ever increasing problem of transmitting and/or storing an enormous amount of information. With limited transmission bandwidth, codecs (coder/decoders) are often employed to cleverly compress the input data into encoded bitstreams, thereby increasing the overall amount of transmitted information.

For example, the Moving Picture Experts Group (MPEG) created the ISO/IEC international Standards 11172 and 13818 (generally referred to as MPEG-1 and MPEG-2 format respectively) to establish a standard for various coding/decoding strategies. Although these MPEG standards specify a general coding methodology and syntax for generating an MPEG compliant bitstream, many variations are permitted to accommodate a plurality of different applications and services such as desktop video publishing, video conferencing, digital storage media and television broadcast.

As such, various novel MPEG codec inventions have been developed to address the needs of different applications. These inventions generally address different coding parameters such as coding mode decisions, rate control, motion estimation/compensation, selection of frame type and the like. These inventions can incorporate very powerful coding methods with capability to analyze the content of the image sequence to deduce various information about the image sequence, e.g., motion information, scene changes and the like. Thus, the resulting codecs are often complex and computationally expensive to implement.

With the implementation of video-on-demand applications, the video source, e.g., a movie, may be repeatedly transmitted to different viewers. Each transmission of the movie often requires the use of an encoder to compress the movie for efficient transmission via a communication channel having a predefined transmission bandwidth. Since the transmission bandwidth and other transmission parameters may change in real time, e.g., high viewing time period versus low viewing time period, the encoder may have to encode the same movie differently for each transmission, i.e., adjusting various coding parameters to accommodate the current transmission parameters.

Unfortunately, some encoders may not be able to adjust the coding parameters properly in light of changing transmission parameters or unusual video content, e.g., scene changes or a series of very complex frames. Furthermore, it would be desirable to reduce the computational cycles of an encoder which is used repeatedly to code the same image sequence, e.g., a movie.

Thus, if information concerning the image sequence ("side information"), e.g., the location of scene cuts, the complexity of a particular frame, the motion information for the frames and the like, can be deduced in advance, such side information can be made available to the encoder to assist the encoder in adjusting a set of coding parameters that will best address a particular transmission or storage environment.

Therefore, a need exists in the art for an apparatus and method that provides "side information" that can be inserted with the image sequence or forwarded directly to the encoder to assist in optimizing the coding of the image sequence.

SUMMARY OF THE INVENTION

The present invention is a method and apparatus for pre-processing an image sequence to extract side information concerning the image sequence. In one embodiment, the side information is then inserted into the image sequence, such that upon being encoded at a later time, the encoder can utilize the side information to best select one or more coding parameters.

Alternatively, the side information can be stored on a storage device instead of being inserted into the image sequence. The stored side information is then made available to an encoder that is tasked with encoding the image sequence.

The availability of advance information concerning the image sequence allows the encoder to best select one or more coding parameters in view of a particular coding environment and in view of the content of the image sequence. Furthermore, by extracting the side information "off line", while the encoding of the image sequence may not be necessary at the present time, it is possible to implement a more powerful preprocessing section up front, where the increase in computational cycles is not a criticality. This allows the implementation of a less complex encoder to use the side information at a later time to quickly code the image sequence, where the decrease in computational cycles is advantageous, e.g., during period of high demand.

BRIEF DESCRIPTION OF THE DRAWINGS

The teachings of the present invention can be readily understood by considering the following detailed description in conjunction with the accompanying drawings, in which.

DETAILED DESCRIPTION

Figure 1:
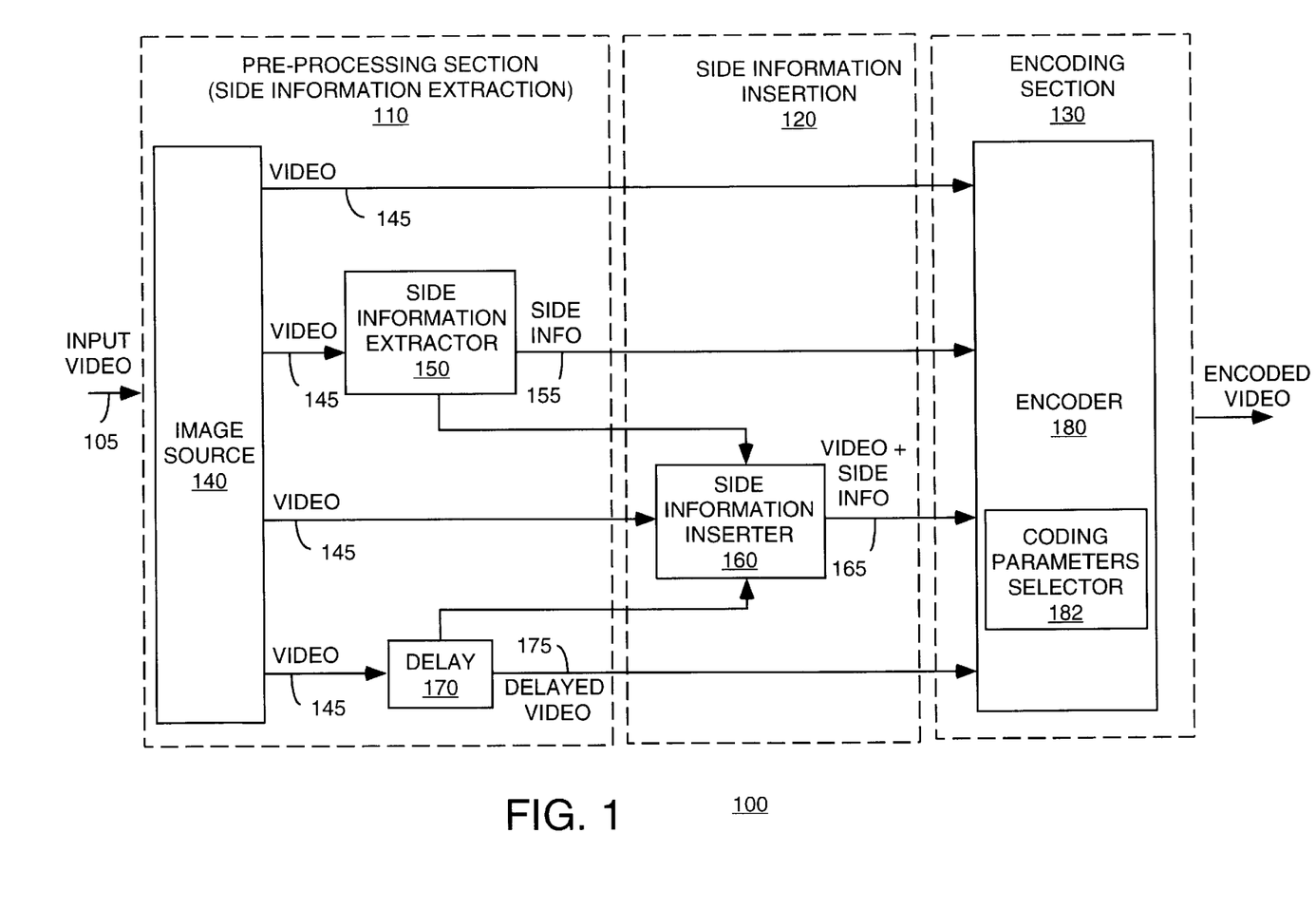
FIG. 1 illustrates a block diagram of the apparatus of the present invention.

FIG. 1 depicts a block diagram of the apparatus 100 of the present invention for pre-processing an image or video sequence to extract side information concerning the image sequence. Although the present invention is described below with reference to an MPEG compliant encoder, those skilled in the art will realize that the present invention can be adapted to other encoders that are compliant with other coding/decoding standards, e.g., H.262, H.261, or MPEG-4.

In the preferred embodiment of the present invention, the apparatus 100 is a coding system. The apparatus 100 comprises a preprocessing section (side information extraction section)110, an optional side information insertion section 120 and an encoding section 130.

The preprocessing section 110 is tasked with the extraction of "side information" from an image sequence. The preprocessing section 110 employs an optional image source 140, a side information extractor 150 and a delay 170.

In one embodiment, the image sequence on path 145 may originate from the image source 140, which can be implemented as one or more image or video servers, with each server having a plurality of stored image or video sequences, e.g., movies, various television programs, sports programs, music videos, and commercials. The image servers can be implemented using one or more storage devices, but are not limited to, disk drives, tape drives, optical drives and the like.

Alternatively, the image sequence from a "live-feed" can be received on path 105 by the preprocessing section 110. The image sequence from the "live-feed" can be stored within image source 140 or passed directly via a delay section 170 to the side information insertion section 120. The delay 170 serves to hold or delay a portion of the image sequence so that the side information extractor 150 has sufficient time to deduce side information for the portion of the image sequence on path 175 that is being delayed. As such, the delay section 170 can be implemented using a temporary storage device, e.g., a First-In-First-Out (FIFO) buffer of sufficient size to hold a portion of the image sequence. The size of the buffer is dictated by the requirements of a particular application. It should be noted that the side information deduced in this delayed fashion is temporally limited. Namely, the extracted side information, e.g., of a live performance, is based on a relatively small number of frames, whereas the side information for a stored movie can be extracted with access to the entire movie.

The side information extractor 150 receives the image sequence on path 145 and generates side information on path 155. In the preferred embodiment, side information extractor 150 is implemented as one or more encoders $910_{a-n}$ as illustrated in FIG. 9.

Figure 9:
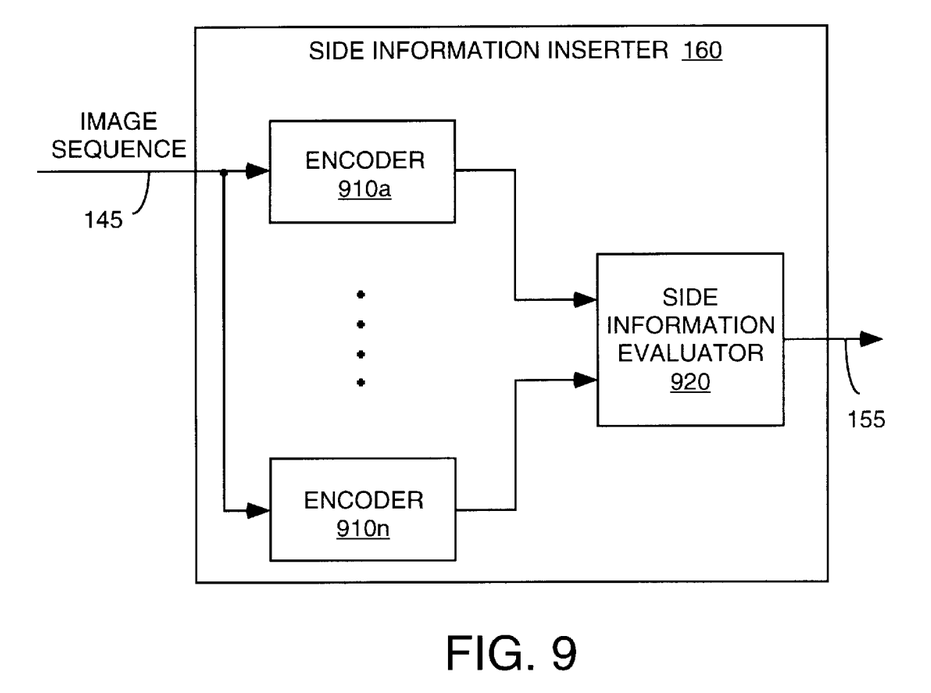
FIG. 9 illustrates a block diagram of a side information extractor of the present invention.

FIG. 9 illustrates a block diagram of one embodiment of the side information extractor of the present invention. More specifically, an image sequence on path 145 is received by a series of encoders $910_{a-n}$, where each encoder may apply a different coding parameter value to the image sequence, e.g., encoder 910, may apply a quantization scale of 15 and encoder $910_b$ may apply a quantization scale of 10 and so on. The encoded bitstreams from these encoders are then evaluated by side information evaluator 920, which compares the different results and then optionally deduces a recommendation with regard to a particular coding parameter for subsequent encoding by the encoder 180.

It should be noted that the format and complexity of the content of the side information are dictated by the implementation of the encoder 180. Namely, if the encoder 180 is an advance encoder, then the side information may simply be "raw data" from the encoders $910_{a-n}$, e.g., the actual distortions from using a quantization scale 15 versus 10. Alternatively, if the encoder 180 is a less advance encoder, then the side information may take the form of a recommendation, e.g., the encoder shall use a quantization scale 10 for this current frame.

It should be noted that for different coding parameters, it may not be necessary to use more than one encoder 910. Namely, it is possible to extract the side information by having encoded the image sequence once. For example, it is possible to detect scene cuts by having encoded the image sequence once. Furthermore, it is possible to use one encoder 910 by simply changing the coding parameter value for the same frame, e.g., coding a frame using a quantization value of 15 and then repeating the coding step using a quantization scale of 10 on the same frame.

Returning to FIG. 1, the side information insertion section 120 comprises a side information inserter 160. The side information inserter 160 receives an image or video sequence on path 145 from the image source 140. The side information inserter 160 also receives side information from the side information extractor 150, which is then inserted into the image sequence to produce an image sequence with side information on path 165.

The extracted side information can be recorded back onto the image sequence, e.g., either as information in the VBI (Vertical blanking interval), e.g., as in the case of closed captioning or in the horizontal interval of an NTSC signal. Alternatively, in a stream conforming to SMPTE-125M, this side information can be inserted as ancillary data. However, the side information can be inserted back into the image sequence in other areas of the image sequence. The present invention is not limited by the location within the image sequence where the side information is inserted, as long as the encoder 180 is designed to detect the presence of the side information at the insertion points.

In one embodiment, the side information is initially extracted from the entire image sequence, e.g., a movie, and then stored for later use by the side information inserter 160. Namely, the movie is then replayed for the purpose of allowing the side information inserter 160 to insert side information at appropriate locations within the movie to assist the encoder 180 in selecting coding parameters.

Alternatively, side information inserter 160 may receive the image or video sequence from the delay section 170. This embodiment is often employed for live feeds, where side information must be extracted and then inserted into the image sequence in near real time condition.

Returning to FIG. 1, the encoding section 130 comprises an encoder 180. The encoder 180 is a video encoder that is capable of receiving data in different form. Namely, the data can be an image sequence on path 145, side information on path 155, an image sequence with side information on path 165 and/or a delayed image sequence on path 175. The encoder 180 includes a coding parameters selector 182 which is capable of using the side information to effect selection of one or more coding parameters that are discussed below. Again, depending on the applications, the coding parameters selector 182 can be implemented as a complex device capable of processing side information that contains raw data or a less complex device that simply applies the recommendation contained in the side information.

Figure 6:
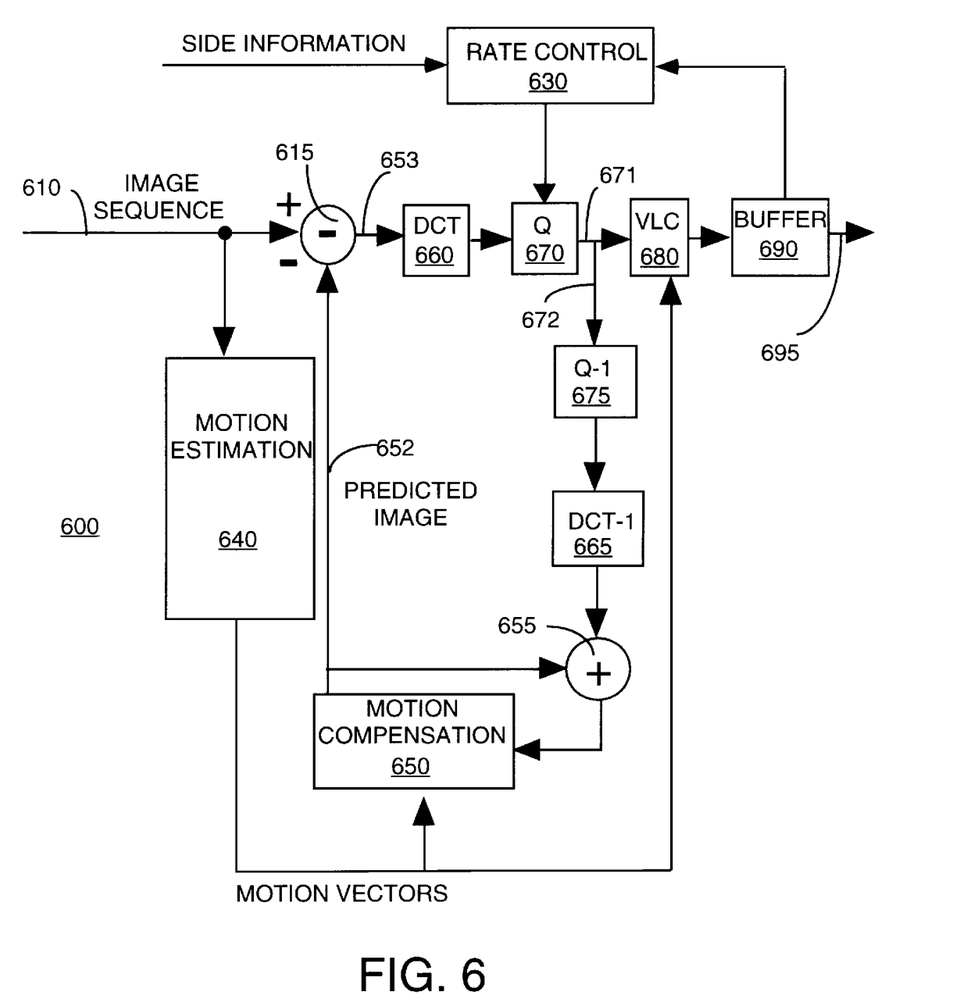
FIG. 6 illustrates a block diagram of an MPEG-compliant encoder of the present invention.
Figure 7:
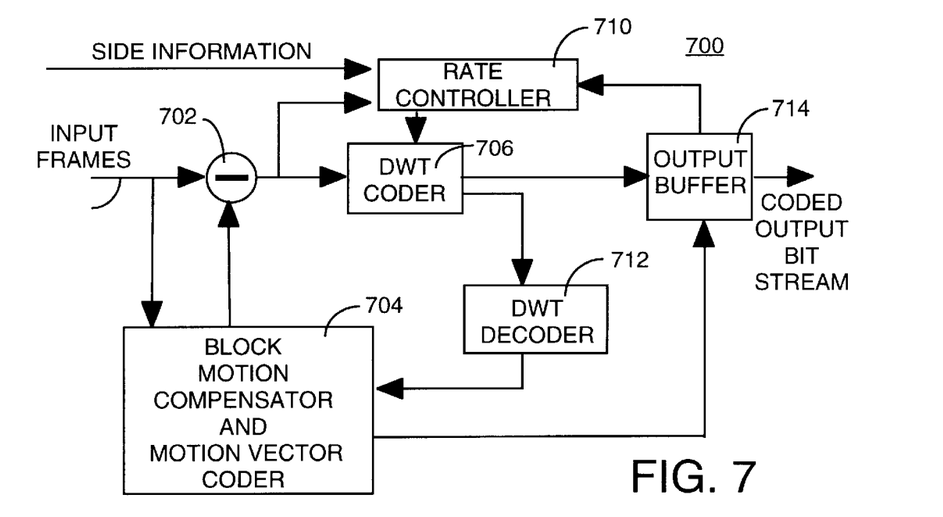
FIG. 7 illustrates a block diagram of a wavelet-based encoder of the present invention.

In one embodiment, the encoder 180 can be implemented using an MPEG compliant encoder as shown in FIG. 6 or a wavelet-based encoder as shown in FIG. 7. However, it should be understood that encoder 180 can be implemented using other types of encoders.

FIG. 6 illustrates a block diagram of an MPEG-compliant encoder 600 that incorporates the present invention. The encoder 600 comprises a motion estimation module 640, a motion compensation module 650, a rate control module 630, a DCT module 660, a quantization (Q) module 670, a variable length coding (VLC) module 680, a buffer 690, an inverse quantization ($Q^{-1}$) module 675, an inverse DCT ($DCT^{-1}$) transform module 665, a subtractor 615 and a summer 655. Although the encoder 600 comprises a plurality of modules, those skilled in the art will realize that the functions performed by the various modules are not required to be isolated into separate modules. For example, the set of modules comprising the motion compensation module 650, inverse quantization module 675 and inverse DCT module 665 is generally known as an "embedded decoder".

In brief, FIG. 6 illustrates an input image (image sequence) on signal path 610 which is digitized and represented as a luminance and two color difference signals (Y, $C_r$, $C_b$) in accordance with the MPEG standards. These signals are further divided into a plurality of layers (sequence, group of pictures, picture, slice, macroblock and block) such that each picture (frame) is represented by a plurality of macroblocks.

The following disclosure uses the MPEG standard terminology; however, it should be understood that the term macroblock or block is intended to describe a block of pixels of any size or shape. Broadly speaking, a "macroblock" could be as small as a single pixel, or as large as an entire video frame.

The input image on path 610 is received into motion estimation module 640 for estimating motion vectors. A motion vector is a two-dimensional vector which is used by motion compensation to provide an offset from the coordinate position of a block in the current picture to the coordinates in a reference frame.

The motion vectors from the motion estimation module 640 are received by the motion compensation module 650 for improving the efficiency of the prediction of sample values. Motion compensation involves a prediction that uses motion vectors to provide offsets into the past and/or future reference frames containing previously decoded sample values that are used to form the prediction error.

Furthermore, prior to performing motion compensation prediction for a given macroblock, a coding mode must be selected. In the area of coding mode decision, MPEG provides a plurality of different macroblock coding modes. Specifically, MPEG-2 provides macroblock coding modes which include intra mode, no motion compensation mode (No MC), frame/field/dual-prime motion compensation inter mode, forward/backward/average inter mode and field/frame DCT mode.

Once a coding mode is selected, motion compensation module 650 generates a motion compensated prediction (predicted image) on path 652 of the contents of the block based on past and/or future reference pictures. This motion compensated prediction on path 652 is subtracted via subtractor 615 from the video image on path 610 in the current macroblock to form an error signal or predictive residual signal on path 653. It should be noted that if a current frame is encoded as an I-frame, then the signal on path 653 is simply the original picture and not a predictive residual signal.

The DCT module 660 then applies a forward discrete cosine transform process to each block of the predictive residual signal to produce a set of eight (8) by eight (8) block of DCT coefficients. The resulting 8×8 block of DCT coefficients is received by quantization module 670 where the DCT coefficients are quantized.

Next, the resulting 8×8 block of quantized DCT coefficients is received by variable length coding (VLC) module 680 via signal connection 671, where the two-dimensional block of quantized coefficients is scanned in a "zig-zag" order to convert it into a one-dimensional string of quantized DCT coefficients. Variable length coding (VLC) module 680 then encodes the string of quantized DCT coefficients and all other information for the macroblock using variable length coding and run-length coding.

The data stream is received into a "First In-First Out" (FIFO) buffer 690, which is used to match the encoder output to the channel for smoothing the bit rate. Thus, the output signal of FIFO buffer 690 on path 695 is a compressed representation of the input video image on path 610 (or a compressed difference signal between the input image and a predicted image), where it is sent to a storage medium or telecommunication channel via path 695.

The rate control module 630 serves to monitor and adjust the bit rate of the data stream entering the FIFO buffer 690 to prevent overflow and underflow on the decoder side (within a receiver or target storage device, not shown) after transmission of the data stream. Thus, it is the task of the rate control module 630 to monitor the status of buffer 690 to control the number of bits generated by the encoder.

However, rate control module 630 can be implemented as a function performed by the coding parameters selector 182. Namely, the coding parameters selector 182 is responsive to side information and is capable of setting one or more coding parameters which includes selection of quantization scales. Furthermore, rate control module 630 illustrates the concept of having different levels of complexity with regard to the content of the side information.

To illustrate, the side information in the format of raw data, e.g., bit rates corresponding to the use of the quantization scales of 15 and 10, as discussed above, can be used by the rate control module 630 to determine whether the buffer fullness is at a state that will allow the use of a finer quantization scale. Alternatively, the rate control module 630 may simply accept and apply the recommended quantization scale from the side information for the current frame.

Finally, the rate control module 630 is shown as an illustration for controlling a particular coding parameter. It should be understood that various other coding parameters, as discussed below, for the encoder 600 can be selected, even though corresponding control modules are not shown in FIG. 6 or FIG. 7 below. In the preferred embodiment, the selection of the coding parameters is implemented via the coding parameters selector 182.

Returning to FIG. 6, the resulting 8×8 block of quantized DCT coefficients from the quantization module 670 is also received by the inverse quantization module 675 via signal connection 672. At this stage, the encoder regenerates I-frames and P-frames of the input video image by decoding the data so that they are used as reference or anchor frames for subsequent encoding.

The resulting dequantized 8×8 block of DCT coefficients are passed to the inverse DCT module 665 where inverse DCT is applied to each macroblock to produce the decoded error signal. This error signal is added back to the prediction signal from the motion compensation module via summer 655 to produce a decoded reference picture (reconstructed image).

FIG. 7 illustrates a block diagram of a wavelet-based encoder 700 that incorporates the present invention. The encoder contains a block motion compensator (BMC) and motion vector coder 704, subtractor 702, discrete wavelet transform (DWT) coder 706, bit rate controller 710, DWT decoder 712 and output buffer 714.

In general, as discussed above the input signal is a video image (a two-dimensional array of pixels (pels) defining a frame in a video sequence). To accurately transmit the image through a low bit rate channel, the spatial and temporal redundancy in the video frame sequence must be substantially reduced. This is generally accomplished by coding and transmitting only the differences between successive frames. The encoder has three functions: first, it produces, using the BMC and its coder 704, a plurality of motion vectors that represent motion that occurs between frames; second, it predicts the present frame using a reconstructed version of the previous frame combined with the motion vectors; and third, the predicted frame is subtracted from the present frame to produce a frame of residuals that are coded and transmitted along with the motion vectors to a receiver.

Figure 8:
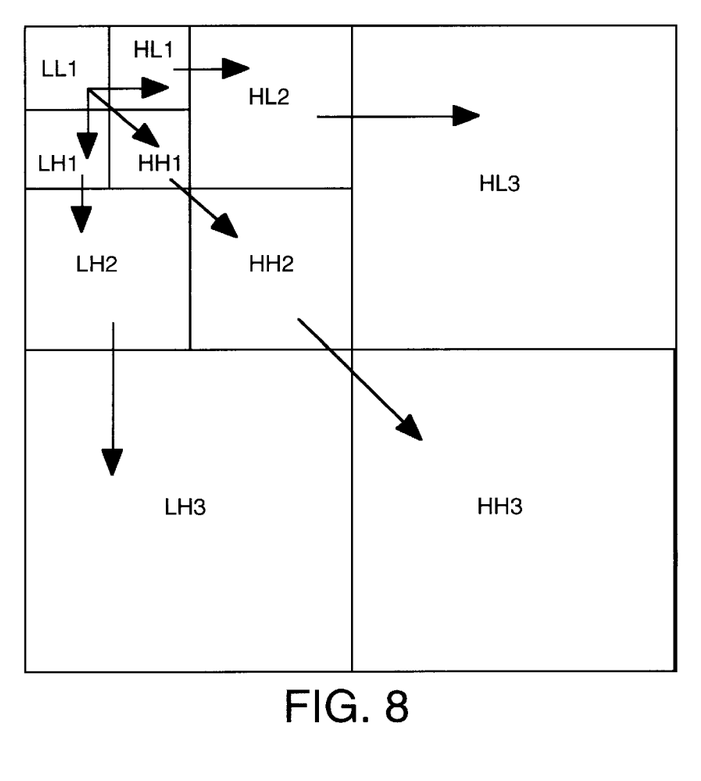
FIG. 8 is a graphical representation of a wavelet tree.

The discrete wavelet transform performs a wavelet hierarchical subband decomposition to produce a conventional wavelet tree representation of the input image. To accomplish such image decomposition, the image is decomposed using times two subsampling into high horizontal-high vertical (HH), high horizontal-low vertical (HL), low horizontal-high vertical (LH), and low horizontal-low vertical (LL), frequency subbands. The LL subband is then further subsampled times two to produce a set of HH, HL, LH and LL subbands. This subsampling is accomplished recursively to produce an array of subbands such as that illustrated in FIG. 8 where three subsamplings have been used. The parent-child dependencies between subbands are illustrated as arrows pointing from the subband of the parent nodes to the subbands of the child nodes. The lowest frequency subband is the top left $LL_1$, and the highest frequency subband is at the bottom right $HH_3$. In this example, all child nodes have one parent. A detailed discussion of subband decomposition is presented in J. M. Shapiro, "Embedded Image Coding Using Zerotrees of Wavelet Coefficients", IEEE Trans. on Signal Processing, Vol. 41, No. 12, pp. 3445–62, December 1993.

The DWT coder of FIG. 7 codes the coefficients of the wavelet tree in either a "breadth first" or "depth first" pattern. A breadth first pattern traverse the wavelet tree in a bit-plane by bit-plane pattern, i.e., quantize all parent nodes, then all children, then all grandchildren and so on. In contrast, a depth first pattern traverses each tree from the root in the low-low subband ($LL_1$) through the children (top down) or children through the low-low subband (bottom up). The selection of the proper quantization level by the rate controller 710 is as discussed above to control the bit rate for each macroblock within each frame of a sequence. Again, the rate controller 710 can be implemented as a function performed by the coding parameters selector 182. As such, the present invention can be adapted to various types of encoders that use different transforms.

FIGS. 6 and 7 illustrate two exemplary encoders that can be used as encoder 180. However, FIGS. 6 and 7 also illustrate two exemplary encoders that can be used as encoder 910. Namely, these encoders can be used to extract or generate the side information as discussed below.

Figure 2:
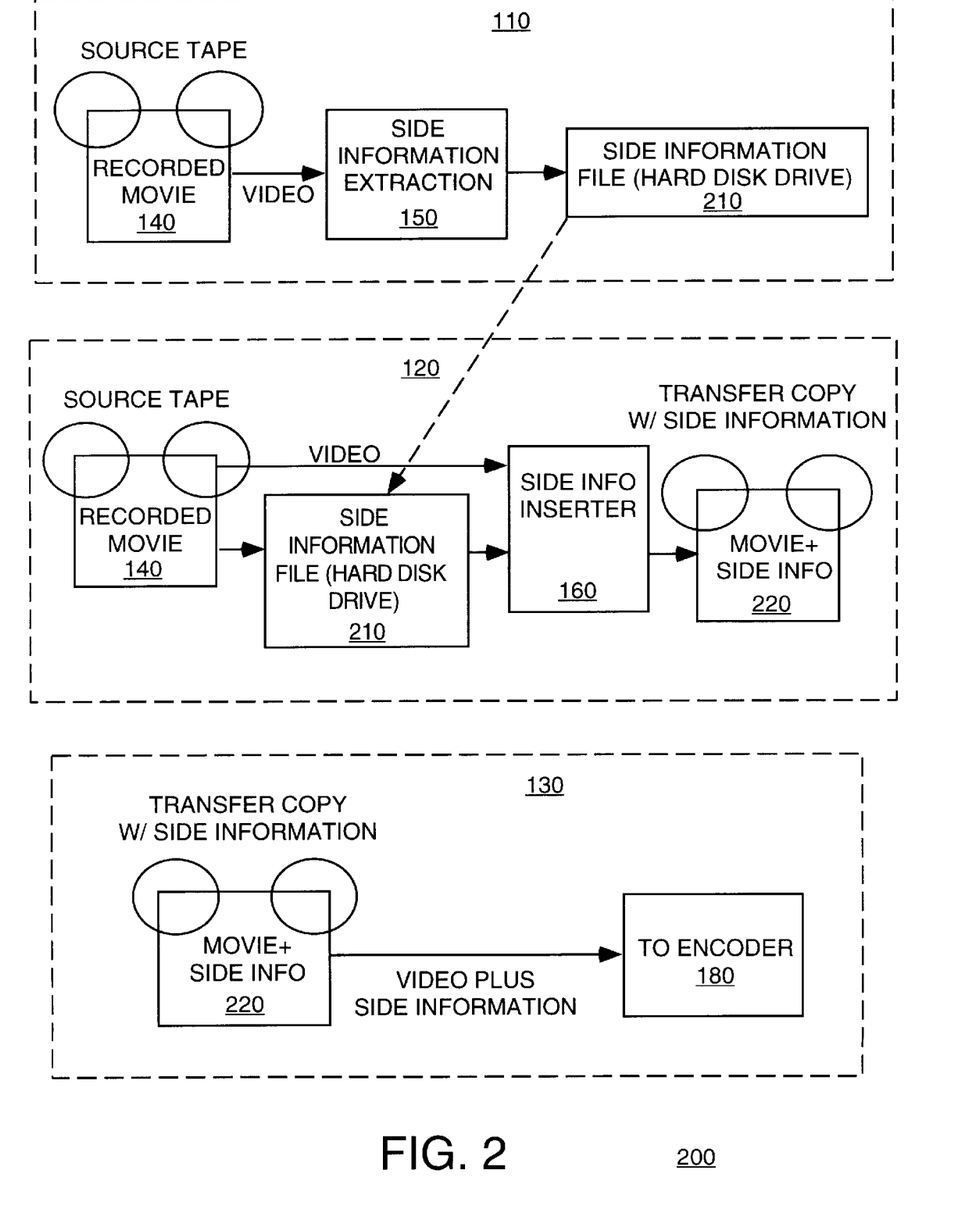
FIG. 2 illustrates a block diagram of a first alternate embodiment of the present encoding system.
Figure 3:
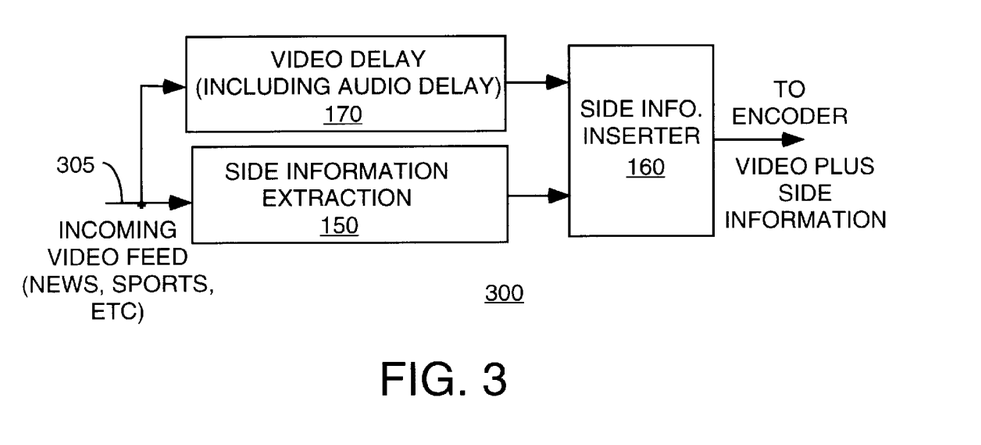
FIG. 3 illustrates a block diagram of a second alternate embodiment of the present encoding system.
Figure 4:
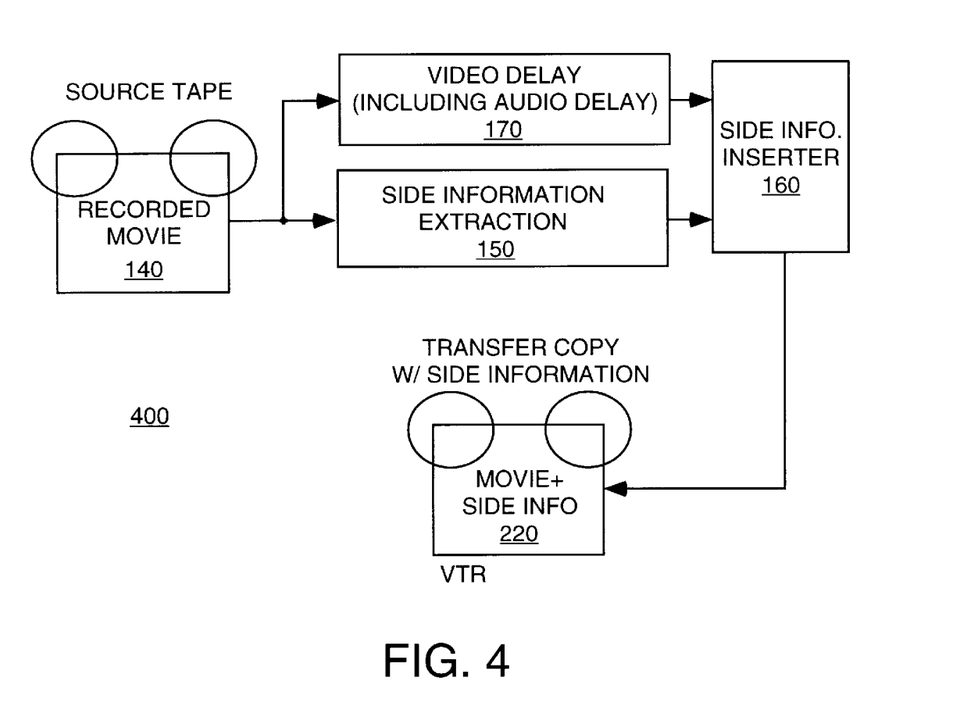
FIG. 4 illustrates a block diagram of a third alternate embodiment of the present encoding system.

FIGS. 2–4 illustrate block diagrams of three alternate embodiments of the present encoding system as shown in FIG. 1. It should be noted that FIG. 1 illustrates a comprehensive encoding system, whereas the embodiments of FIGS. 2–4 illustrate encoding systems having various aspects of the more comprehensive encoding system of FIG. 1.

FIG. 2 illustrates an encoding system 200 that shares many similar components as discussed above in FIG. 1. The description of these components are provided above.

The encoding system 200 comprises a side information extraction section 110 having an image source 140 (e.g., a source tape of a movie), a side information extraction module 150 and a storage device 210 for storing the extracted side information. In operation, the recorded movie stored in the image source is provided as an image sequence to the side information extraction module 150 (a first pass), which, in turn, extracts and stores the side information onto the storage device 210 in the form of a side information file. The side information file is then made available to the side information insertion section 120.

In the side information insertion section 120, the recorded movie stored in the image source 140 is provided (a second pass) in conjunction with the stored side information to the side information inserter 160, which, in turn, generates an image sequence with the embedded side information. The modified image sequence is then stored onto a storage device 220 for later use. The image source 140 and storage device 220 can be implemented as a single device, e.g., a video server. Namely, the movie is now embedded with side information that will assist an encoder 180 in encoding the movie at a later time in the encoding section 130.

FIG. 3 illustrates an encoding system 300 that is appropriate for incoming live feeds, e.g., live sports events, news and the like. The incoming image sequence on path 305 is delayed by video delay 170 for a predefined number of frames, e.g., one second of video. The audio frames corresponding to the delayed video frames are also delayed to maintain synchronization. The delay allows the side information extraction module 150 sufficient time to deduce side information for the delayed frames. Again, the extracted side information is then inserted with the image sequence and then forwarded to the encoder 180.

FIG. 4 illustrates an encoding system 400 that is very similar to the encoding system 300. The main difference is that the input image sequence is not from a live-feed, but instead, originates from an image source 140 similar to that of the encoding system 200. However, unlike the two-pass method of the encoding system 200, encoding system 400 only requires a single pass (a single playing) of the input image sequence to generate the image sequence with the embedded side information. The encoding system 400 provides savings in total processing time and computational cycles, but the extracted side information is temporally limited as compared to the extracted side information of encoding system 200.

Figure 5:
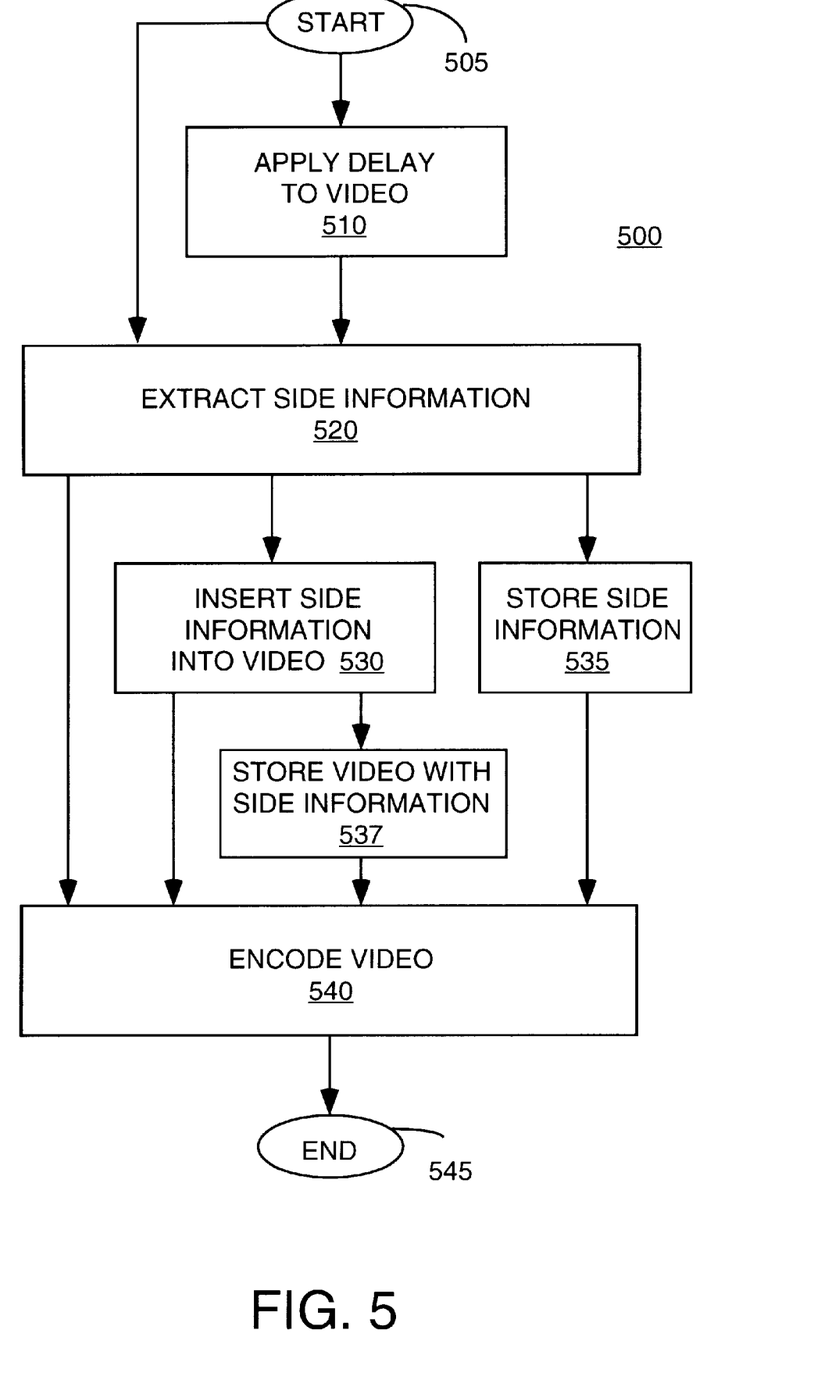
FIG. 5 illustrates a flowchart of a method for extracting side information to optimize the encoding process.

FIG. 5 illustrates a flowchart of a method 500 for extracting side information to optimize the encoding process. The method starts in step 505 and proceeds to step 510, where a delay is optionally applied to the image or video sequence. The delay can be used if the input video sequence is from a live feed and requires near real time transmission. However, if the input video sequence is stored on a storage device and does not require real time transmission, then step 510 can be omitted, unless the single pass method of encoding system 400 is implemented.

In step 520, method 500 extracts or generates side information from the input video sequence. Once the side information is extracted, method 500 can proceed in one of three different branches.

First, method 500 can forward the side information directly to an encoder in step 540, where the encoder will immediately use the side information to properly select one or more coding parameters in coding the input image sequence.

Second, method 500 can forward the side information to a side information inserter in step 530, where an image sequence with the embedded side information is generated. In turn, image sequence with the embedded side information can be stored in a storage device in step 537 or the image sequence with the embedded side information can be forwarded directly to step 540 for encoding.

Third, method 500 can store the side information in a storage device in step 535 for later use by the encoder. Namely, the stored side information can be accessed whenever the input image sequence is actually being encoded in step 540 by the encoder. Finally, method 500 ends in step 545.

The following sections describe various coding parameters that can be selected in accordance with the extracted side information. Namely, side information can be useful in selecting these coding parameters or to address various coding criticalities.

Frames Until Next Scene Change

An encoder might normally encode frames using a predefined sequence of I, P and B frames, e.g., as shown below under "Normal Order". However, it is well known that when a scene change occurs (also known as scene cut), it is very difficult to efficiently predict a frame from another frame showing an unrelated scene. As such, various scene cut detection methods have been developed to detect scene cuts, and then insert I frames whenever a scene change is found.

However, inserting I frames is expensive in terms of bits, and sometimes a scene cut may occur just after an I frame. This situation is shown below under "Without Side Information", where a scene change occurred at a frame labeled $B_{SC}$. In accordance with various scene detection methods, an I frame is inserted upon detection of the scene change. Namely, the P frame following the frame labeled $B_{SC}$ as shown in the normal order is now replaced with an I frame instead. Although the insertion of the I frame addresses the criticality of scene change, it demonstrates the proximity of two closely spaced I frames. In that situation it is preferred to delay the I frame that occurred just before the scene change until the scene change has occurred as shown under "With Scene Cut". Namely, the I frame before the scene change is replaced with a P frame shown as P*, since a scene cut is about to occur.

Normal Order: I B B P B B P B B I B B P
Without Side Information: I B B P B B P B B I B $B_{SC}$ I
With Scene Cut: I B B P B B P B B P* B $B_{SC}$ I Thus, it would be very advantageous to be able to extract side information that is indicative of the locations of scene changes for the entire image sequence or portions thereof in advance. The extraction of such scene change side information can be achieved by using a conventional scene cut detection method or by employing a human operator to visually identify the locations of scene changes. The actual format of this scene change side information can be implemented in different ways. The side information may take the form of raw data which simply indicates the locations of a scene change. Alternatively, the side information may take the format of a recommendation which simply recommends the use of an I frame at predefined frame locations within the image sequence.

In one embodiment of the present invention, side information indicative of scene change is implemented as to how soon a scene cut will occur, i.e., in the form of relative distance from a current frame. The side information can be implemented by marking all frames in the image sequence, where a scene cut will occur within a predefined number of frames, e.g., 10 frames (or mark each field for mixed film/video signals). This implementation may incur a few bits per frame. Extraction of this side information can be performed in the two-pass extraction encoding system as shown in FIG. 2, or, as shown in FIG. 3 for live feeds, if the video delay is set to some predefined number of frames, e.g., at least 10 frames.

First, it should be noted that the side information can be generated even if the pre-processing section does not know the encoder's IPB sequencing or phasing. Second, since most scene detection methods are computationally expensive, the bulk of the processing can be performed "off line" by the pre-processing section instead of the encoder 180. This allows the encoder 180 to operate quickly and efficiently without the need of a large memory space and a large computational expense, which is typically necessary if scene cut detection is performed by the encoder 180.

Degree of Motion

If the video sequence or portions thereof contain very little motion, the frequency of P frames can be reduced, thereby reducing the number of encoded bits. Namely, if a still image sequence is detected, the encoder 180 may be able to insert more B frames between P frames. In turn, the encoder 180 may spend more bits at the I and P frames, and then use prediction only for B frames which closely resemble their anchor (I or P) frames.

Thus, it would be very advantageous to be able to extract side information that is indicative of degree of motion for the entire image sequence or portions thereof in advance. The extraction of such degree of motion side information can be achieved by using a plurality of encoders 910.

More specifically, one method of detecting or extracting such side information is to employ two encoders $910_{a-b}$, where one of the encoder 910a ("alternate encoder") attempts to encode I and P frames in a different way (i.e., using different encoding rules or coding parameters) from that of the other encoder $910_b$ ("normal encoder"). The encoder $910_b$ can be set to encode the image sequence using a set of coding parameters that are similar to the encoder 180, thereby allowing the comparison of the performance of the encoder 180 in advance with an alternate encoder 910, using a different set of coding parameters.

One different way of encoding the image sequence is to allocate more accuracy than the "normal" encoder to I and P frames. Another different way of encoding might be to space the P frames farther apart (with more B frames between them). Yet another different way of encoding is to set a threshold (e.g., based on histograms) for gauging motion such that if the motion level within a frame is less than the threshold, the frame should be coded as a B frame. Other different ways of encoding can be crafted in accordance with a particular application to detect degree of motion.

For example, if the "normal" encoder spends more total bits on a Group of Pictures (GOP) (which contains I, P and B frames), then the "alternate" encoding set of coding parameters are better, and the GOP should likely be encoded in this different way. The results of this comparison can be represented as side information in the format of raw data or recommendation to use a particular set of coding parameters.

This side information is preferably sent to the actual encoder 180 in advance of the GOP so that "frame type synchronization" can be effected by the encoder 180. Namely, if the encoder 180 decides to follow the GOP structure recommended in the side information in its entirety, then the encoder 180 must have sufficient time to synchronize or properly correlate the set of frames that are part of the recommended GOP structure. However, the encoder 180 may only accept part of the recommended GOP structure, e.g., on a frame by frame basis, where synchronization is not relevant.

Anomalous Frame Detection

Some image sequences have single-frame anomalies, such as flash bulb lit scenes. Generally, it is desirable to avoid coding an anomalous frame as a P or I frame, since future frames are predicted from these anchor frames. The reason is that if the anomalous frame is encoded as a P frame, then subsequent frames will require more bits to account for the change in brightness.

Thus, it would be very advantageous to be able to extract side information that is indicative of the locations of anomalous frames for the entire image sequence or portions thereof in advance. The extraction of such anomalous frame side information can be achieved by analyzing several frames, e.g., comparing the frames immediately before and after the current frame under consideration. For example, a current frame is compared with a preceding and subsequent frame as to luminance values. If the current frame differs from the previous and subsequent frames significantly more than they differs from each other, then it is likely that an anomalous frame has been detected.

If a frame is deemed to be an anomalous frame, it should be encoded as a B frame (i.e., delaying or advancing I or P encoding by one frame). However, the result from the above comparison can be represented as side information in the format of raw data (luminance comparison result) or recommendation to use a type of frame, e.g., a B frame for an anomalous frame in the image sequence. For example, the side information can be implemented as an one-bit-per-frame (or field) rate information stream. The encoding parameters for an anomalous B frame may also be chosen to differ from normal B frame encoding, e.g., high frequency components may be more severely quantized using an alternate quantizer matrix.

Fade-Out Detection

Image sequences such as movies often employ "fade-out", where the brightness level is reduced for each successive frame. Unfortunately, when movies "fade out", some encoders with good motion detection schemes often perform poorly in fade-out situation. This is due to the fact that some good motion detection schemes rely on the brightness level for matching macroblocks. In contrast, alternative motion detection schemes that do not suffer from fade-out confusion, often are found to be less superior in performance with regard to normal video. Thus, an encoder designer must often balance or trade-off between the need of an encoder to perform good motion estimation/compensation and the ability to detect fade-out conditions in the image sequence.

Thus, it would be very advantageous to be able to extract side information that is indicative of the locations of fade-out frames for the entire image sequence or portions thereof in advance. The extraction of such fade-out frame side information can be achieved by using a plurality of encoders 910.

For example, one method of detecting or extracting such side information is to employ two encoders $910_{a-b}$, where one of the encoder $910_a$ ("alternate encoder") employs a motion/estimation method that is heavily geared toward the detection of fade-out conditions. For example, encoder $910_a$ can be implemented such that DC coefficients are removed for each macroblock for a current frame prior to performing motion compensation. Fade-out frames can be detected, since changes between fade-out frames are stored predominately in the DC coefficients. The removal of the DC coefficients should produce a very small residual or error signal, since there is little change between successive fade-out frames except for brightness.

In turn, the encoder $910_b$ can be set to encode the image sequence using a motion/estimation method that is similar to the encoder 180 or similar to an encoder that is heavily geared toward motion detection. It is anticipated that encoder $910_b$ will perform better over normal video, while encoder $910_a$ will perform better over fade-out conditions. Thus, on a frame by frame basis, if the error signal from encoder $910_a$ is small and the error signal from encoder $910_b$ is large, then it is likely that the current frame is in a fade-out condition, i.e., a fade-out frame. This detection method allows the comparison of the performance of the encoder 180 in advance with an alternate encoder $910_a$ using a different set of coding parameters.

If a frame is deemed to be a fade-out frame, the encoder should switch to an alternate motion compensation scheme that is geared toward handling fade-out frames or modify the rate control to provide more bits. However, the result from the above comparison can be represented as side information in the format of raw data (error signal comparison result) or recommendation to use a different motion compensation method by the encoder 180 for a set of fade-out frames.

Aggregate Global Complexity of the Next N Frames

Some encoders use the concept of "complexity" which is a measure of the complexity of the content of a current frame. For example, a frame that has many objects moving in various directions can be referred to as a frame having high complexity, since many bits will be needed to code the residual signal and the numerous associated motion vectors. Thus, some encoders will employ a method for assigning complexity measure to each frame and based upon such assignment, bit budget can be set for a frame, e.g., more bits will be assigned to a very complex frame.

The Test Model 5 (TM5) of the MPEG standards includes a method of computing the global complexity of I, P and B frames using the average quantization scale and number of bits-per-picture. Namely, after a picture of a certain type (I, P, or B) is encoded, TM5 uses the result of the encoding to establish the complexity of each type of picture. Subsequently, it is assumed that all the pictures of the same type have identical complexity within a group of pictures. Unfortunately, the complexity assignment method of TM5 is limited to past frames, i.e., the complexity measure for a current frame is based entirely upon the complexity of previously encoded frames. If the complexity of a set of frames suddenly increases, most encoders would not be able to anticipate such changes and may perform poorly in term of bit budget management.

Thus, it would be very advantageous to be able to extract side information that is indicative of the complexity for the entire image sequence or portions thereof in advance. The extraction of such complexity side information can be achieved by using one or more encoders 910.

For example, an encoder 910 can be used to encode an image sequence and then store the number of bits used to encode each frame for a particular quantization scale. The stored information would be a measure of "actual" complexity, since the encoder knows exactly the number of bits necessary to encode a frame at a particular quantization scale.

The stored result from the above encoding process can be represented as side information in the format of raw data (the number of bits for encoding a frame at a particular quantization scale) or as recommendation to assign a particular complexity measure for a frame by the encoder 180 for a GOP.

Since the complexity side information can be made available to the encoder 180 in advance, the encoder 180 can incorporate finite impulse response (FIR) filtering or Transversal filtering techniques to compute the regional value for global complexity. Namely, a FIR filter uses values from both preceding and following frames to compute complexity for a given frame.

More specifically, the pre-processing section 110 encodes the image sequence, and produces an output value corresponding to the complexity for a current frame as side information. This side information can be inserted onto the image sequence in advance of the frame to which it refers. The coding parameter selector 182 or rate control module would then use this side information instead of the real time previously encoded frame information as a basis for I, P and B frame bit allocation.

Furthermore, armed with the knowledge of having encoded the entire image sequence, it is now possible to craft a complexity measure that is based in reverse time (whereas normally in TM5, it is filtered in forward time). Namely, the encoder 180 can now evaluate complexity based upon the knowledge of frames to come versus the frames that have been previously encoded. This provides a warning of potential trouble (e.g., a series of very complex frames) to come, and the encoder 180 can react accordingly.

F-Code Needed For This Frame

Typically, an encoder will set a predefined dynamic range (known as F-code) to represent motion information, e.g., using five bits to represent motion vectors. Thus, large motion vectors will typically require a larger F-code, whereas smaller motion vectors can be represented using a smaller F-code. Matching the proper size F-code with the motion information for each frame will generate saving in the number of coded bits.

Thus, it would be very advantageous to be able to extract side information that is indicative of the F-code for the entire image sequence or portions thereof in advance. The extraction of such F-code side information can be achieved by using an encoder 910 having coding parameter settings that are similar to the encoder 180. Namely, an image sequence is initially encoded using the encoder 910. Since the motion information is now available for the entire image sequence, an adequate dynamic range (F-code) can be selected to represent the motion information for each frame.

The result from the above analysis can be represented as side information in the format of raw data (the actual range of motion information for each frame) or as a recommendation to use a particular F-code value for a particular frame in the image sequence.

3:2 Pulldown Advice (repeat first field)

An important function of an encoder is the implementation of "3:2 pull down", which is a feature for representing 24 frames-per-second (fps) motion picture film (movie) as 30 fps video. Each movie picture or frame can be independently specified to be displayed for two or three video field periods. However, the optimal determination of when to repeat a field as a film frame is a very computationally intensive process. It may not be practical to incorporate such expensive hardware into encoder 180 to perform such calculation at that stage.

It should be noted that if the present encoding system is incorporated into a digital studio, it is likely that there will be numerous channels with each channel having at least one encoder 180. Thus, there is an advantage in minimizing the complexity of the encoder 180 in term of cost and computational cycles, e.g., increasing the speed of encoding an image sequence into an encoded bitstream.

Thus, it would be very advantageous to be able to extract side information that is indicative of the 3:2 pull down selection for the entire image sequence or portions thereof in advance. The extraction of such 3:2 pull down selection side information can be achieved by using an encoder 910 in the pre-processing section 110. Namely, an image sequence is initially encoded using the encoder 910, which is a more complex encoder that is capable of making the 3:2 pull down selection for each frame, i.e., whether "repeat_first_field" should be used for a frame.

The result from the above analysis by the encoder 910 can be represented as side information in the format of raw data or as a recommendation to use "repeat_first_field" for a particular frame in the image sequence.

Per-Stripe Target Success

Some encoders provide bit budget control beyond the frame level, i.e., there are bit budgets for a stripe, a row, or a slice of an image (a stripe may be multiple rows, and a slice is either the same as or a fraction of the length of a row). Accurate bit budget management optimizes coding efficiency while controlling overflow and underflow conditions.

Thus, it would be very advantageous to be able to extract side information that is indicative of bit budget selections for the entire image sequence or portions thereof in advance. The extraction of such bit budget selections side information can be achieved by using an encoder 910 having coding parameter settings that are similar to the encoder 180. Namely, an image sequence is initially encoded using the encoder 910 in the preprocessing section 110. This allows the encoder 910 to verify the bit budgeting methods of encoder 180 in advance. Alternatively, one or more encoders 910 in the pre-processing section 110 can be employed to analyze a plurality of bit budgeting methods.

The result from the above analysis by the encoder(s) 910 can be represented as side information in the format of raw data (the number of actual bits used to encode a stripe, a row, or a slice of a particular frame) or as a recommendation to use a particular bit budget for a stripe, a row, or a slice for a particular frame or a choice of bit budgeting method.

Bits Needed to Encode This frame at a Constant Quantization Scale/Quality

Coding efficiency can be increased if an encoder is able to determine the trade-off in increasing or decreasing the quantization scale for a frame. This information assists an encoder in spending its bit budget.

Thus, it would be very advantageous to be able to extract side information that is indicative of the quantization scale selection for the entire image sequence or portions thereof in advance. The extraction of such quantization scale selection side information can be achieved by using one or more encoders 910.

For example, a plurality of encoders 910 can be used to encode an image sequence using different quantization scales and then store the number of bits used to encode each frame for a particular quantization scale. The result from the above analysis by the encoders 910 can be represented as side information in the format of raw data (the number of actual bits used to encode each frame at a particular quantization scale or in the form of a graph) or as a recommendation to use a particular quantization scale for a particular frame.

Bits Needed to Encode This Frame (P or B) Assuming Various I (&P) Quality Levels Coding efficiency can be increased if an encoder is able to determine the trade-off in increasing or decreasing the quality of a particular frame, e.g., changing quantization scale or mode decision for the anchor frames I and/or P. Again, this information assists an encoder in spending its bit budget. However, changing the quality of an anchor frame has effect on all other frames that rely on such anchors. As such, it is informative to an encoder if it has information as to the effect of changing the quality of an anchor frame.

Thus, it would be very advantageous to be able to extract side information that is indicative of the effect in changing the quality of an anchor frame for the entire image sequence or portions thereof in advance. The extraction of such quality based side information can be achieved by using one or more encoders 910.

For example, a plurality of encoders 910 can be used to encode an image sequence using different quantization scales for the anchor frames I and/or P within a GOP, and then store the number of bits used to encode the GOP for each encoder 910. The quality level selection scheme for the encoder 910 that used the least number of bits to encode the GOP, is assumed to be the most ideal.

It should be noted that other coding parameters can be adjusted to alter the quality of an anchor frame instead of changing the quantization scale, e.g., specifying a different quantizer matrix or selecting different coding modes for the anchor frames and the like. Thus, the above analysis can be performed by encoding the image sequence by changing other coding parameters that affect quality of the anchor frames.

The result from the above analysis by the encoders 910 can be represented as side information in the format of raw data (the number of actual bits used to encode the GOP for each encoder) or as a recommendation to use a particular quality level (e.g., a particular quantization scale) for a particular anchor frame.

Filtering/ Quantization Matrix Advice

Measurement of noise in an image sequence is computationally intensive, but high noise level in the image sequence has a significant effect on bit rate. The noise level can be erroneously treated as information and causes the encoder to spend bits in encoding the noise level in the form of large error signals. However, if the noise can be identified and made known to the encoder, then it is possible to adjust various coding parameters to handle the noise accordingly.

Thus, it would be very advantageous to be able to extract side information that is indicative of noise for the entire image sequence or portions thereof in advance. The extraction of such noise side information can be achieved by using an encoder 910 having coding parameter settings that are similar to the encoder 180. Namely, an image sequence is initially encoded by using the encoder 910 in the preprocessing section 110. This allows the encoder 910 to identify frames or portions within a frame having high level of noise. However, other noise detection methods can be employed, e.g., using video measurement devices such as VM700 from Tektronix of Beaverton, Oreg.

The result from the above analysis by the encoder 910 can be represented as side information in the format of raw data (e.g., the location of noise in the image sequence) or as a recommendation to use a particular quantization scheme at locations having high noise levels for a particular frame. Namely, if noise is high for a frame, the encoder 180 can reduce the bitrate by changing the quantization matrix, or execute a noise filtering routine prior to encoding the image sequence. Conversely, if the image sequence has low brightness (e.g. a night scene or old movies), finer quantization scales can be employed.

Several broad observations should be noted for the above set of side information. First, it should be understood that the above side information extractor 150 does not have to be implemented as an encoder. It is possible to implement the side information extractor 150 in other forms as long as the above side information can be extracted as discussed.

Second, although the above discussion may describe the use of one or two encoders 910, it should be understood that multiple encoders 910 can be used to generate more raw data using different variations in coding parameter values. Conversely, although the above discussion may describe the use of multiple encoders 910, it should be understood that a single encoder 910 can be used by encoding the image sequence repeatedly while changing the coding parameters.

Third, the choice to implement the side information as raw data or actual recommendation is based on the requirement of the encoder 180 for a particular application. For example, if the encoder 180 is operating within a variable bit rate environment, the encoder 180 is more receptive to raw data, thereby allowing the encoder 180 to assess the coding requirement for itself in view of the current coding environment, e.g., many bits are available for use versus very few bits are available.

Finally, although the above side information extractor 150 is implemented as one or more encoders, it is possible to implement the various detection functions by using a human viewer. Namely, it is possible to use a human viewer to extract the side information from the image sequence. However, the extraction process is tedious and a human viewer may introduce his or her subjective opinion into the side information.

Figure 10:
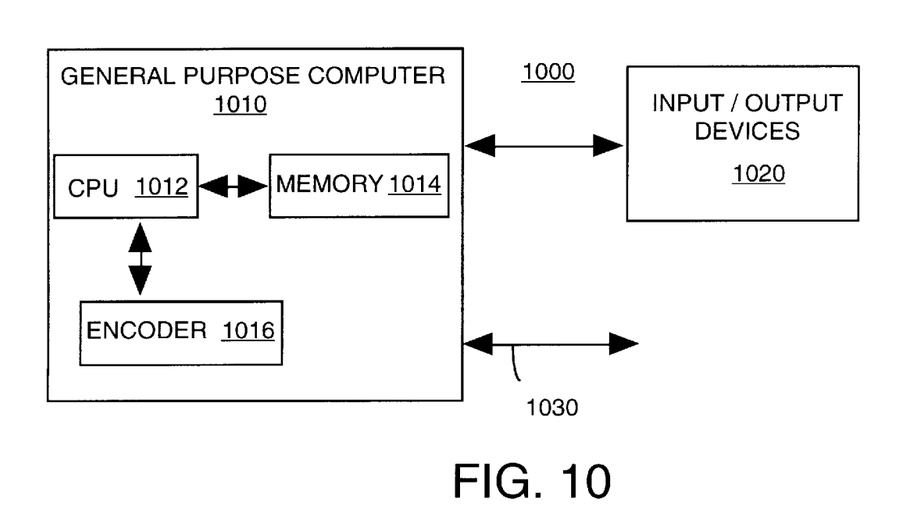
FIG. 10 illustrates a block diagram of an embodiment of the present encoding system implemented using a general purpose computer.

FIG. 10 illustrates a block diagram of an embodiment of the present encoding system 1000 implemented using a general purpose computer. The encoding system comprises a general purpose computer 1010 and various input/output devices 1020. The general purpose computer comprises a central processing unit (CPU) 1012, a memory 1014 and an encoder 1016 for receiving and encoding a sequence of images.

In the preferred embodiment, the encoder 1016 is simply the encoding systems 100, 200, 300, 400 (or portions thereof), and/or encoders 600 and 700. The encoder 1016 can be a physical device which is coupled to the CPU 1012 through a communication channel. Alternatively, the encoder 1016 can be represented by a software application (or a combination of software and hardware, e.g., application specific integrated circuits (ASIC)) which is loaded from a storage device and resides in the memory 1012 of the computer. As such, the encoding systems 100, 200, 300, 400, and/or encoders 600 and 700 of the present invention, including the bitstreams generated by these encoders (e.g., the video sequence with the side information), can be stored on a computer readable medium, e.g., a memory or storage device.

The computer 1010 can be coupled to a plurality of input and output devices 1020, such as a keyboard, a mouse, a camera, a camcorder, a video monitor, any number of imaging devices or storage devices, including but not limited to, a tape drive, a floppy drive, a hard disk drive or a compact disk drive. The input devices serve to provide inputs to the computer for producing the encoded video bitstreams or to receive the sequence of video images from a storage device or an imaging device. Finally, a communication channel 1030 is shown where the encoded signal from the encoding system is forwarded to a decoding system (not shown).

There has thus been shown and described a novel apparatus and method that extracts side information from an image sequence to optimize the coding of the image sequence. Many changes, modifications, variations and other uses and applications of the subject invention will, however, become apparent to those skilled in the art after considering this specification and the accompanying drawings which disclose the embodiments thereof. All such changes, modifications, variations and other uses and applications which do not depart from the spirit and scope of the invention are deemed to be covered by the invention.

What is claimed is:

1. A method for encoding a frame of an image sequence, said method comprising the steps of:
   (a) extracting side information from said image sequence; and
   (b) encoding a frame of said image sequence in accordance with said side information.

2. The method of claim 1, wherein said extracting step (a) comprises the step of extracting degree of motion side information from said image sequence.

3. The method of claim 1, wherein said extracting step (a) comprises the step of extracting anomalous frame side information from said image sequence.

4. The method of claim 1, wherein said extracting step (a) comprises the step of extracting fade-out frame side information from said image sequence.

5. The method of claim 1, further comprising the step of:
   (a') inserting said side information into said image sequence; and wherein said encoding step (b) encodes said frame of said image sequence in accordance with said inserted side information.

6. The method of claim 5, wherein said extracting step (a) comprises the step of extracting scene change side information from said image sequence.

7. The method of claim 5, wherein said extracting step (a) comprises the step of extracting degree of motion side information from said image sequence.

8. The method of claim 5, wherein said extracting step (a) comprises the step of extracting anomalous frame side information from said image sequence.

9. The method of claim 5, wherein said extracting step (a) comprises the step of extracting fade-out frame side information from said image sequence.

10. The method of claim 5, wherein said extracting step (a) comprises the step of extracting complexity side information from said image sequence.

11. The method of claim 5, wherein said extracting step (a) comprises the step of extracting F-code side information from said image sequence.

12. The method of claim 5, wherein said extracting step (a) comprises the step of extracting 3:2 pull down selection side information from said image sequence.

13. The method of claim 5, wherein said extracting step (a) comprises the step of extracting bit budget selection side information from said image sequence.

14. The method of claim 5, wherein said extracting step (a) comprises the step of extracting quantization scale selection side information from said image sequence.

15. The method of claim 5, wherein said extracting step (a) comprises the step of extracting quality based side information from said image sequence.

16. The method of claim 5, wherein said extracting step (a) comprises the step of extracting noise side information from said image sequence.

17. The method of claim 1, further comprising the step of:
   (a') storing said side information into a storage; and wherein said encoding step (b) encodes said frame of said image sequence in accordance with said stored side information.

18. The method of claim 17, wherein said extracting step (a) comprises the step of extracting scene change side information from said image sequence.

19. The method of claim 18, wherein said extracting step (a) comprises the step of extracting degree of motion side information from said image sequence.

20. The method of claim 17, wherein said extracting step (a) comprises the step of extracting anomalous frame side information from said image sequence.

21. The method of claim 17, wherein said extracting step (a) comprises the step of extracting fade-out frame side information from said image sequence.

22. The method of claim 1, further comprising the step of:
   (a') applying a delay to said image sequence.

23. The method of claim 22, wherein said extracting step (a) comprises the step of extracting degree of motion side information from said image sequence.

24. A method for generating an image sequence with side information, said method comprising the steps of:
   (a) generating side information from an input image sequence; and
   (b) inserting said side information onto said input image sequence to form the image sequence with side information.

25. An apparatus for encoding a frame of an image sequence, said apparatus comprising:
   a side information extractor for extracting side information from said image sequence; and
   an encoder for encoding a frame of said image sequence in accordance with said side information.

26. The apparatus of claim 25, further comprising a side information inserter, coupled to said side information extractor, for inserting said side information into said image sequence.

27. The apparatus of claim 25, further comprising a storage, coupled to said side information extractor, for storing said side information.

28. The apparatus of claim 25, further comprising a delay, coupled to said encoder, for applying a delay to said image sequence.

29. A computer-readable medium having stored thereon a plurality of instructions, the plurality of instructions including instructions which, when executed by a processor, cause the processor to perform the steps of:
   (a) extracting side information from said image sequence; and
   (b) encoding a frame of said image sequence in accordance with said side information.

30. A bitstream in a computer-readable medium, said bitstream comprising an image sequence with side information, where said side information is for assisting an encoder in selecting a coding parameter for encoding said image sequence.

* * * * *